(12) United States Patent
Chakradhar et al.

(10) Patent No.: US 8,762,794 B2
(45) Date of Patent: Jun. 24, 2014

(54) CROSS-LAYER SYSTEM ARCHITECTURE DESIGN

(75) Inventors: Srimat Chakradhar, Manalapan, NJ (US); Hyungmin Cho, Stanford, CA (US); Anand Raghunathan, West Lafayette, IN (US)

(73) Assignee: NEC Laboratories America, Inc., Princeton, NJ (US)

( * ) Notice: Subject to any disclaimer, the term of this patent is extended or adjusted under 35 U.S.C. 154(b) by 175 days.

(21) Appl. No.: 13/299,578

(22) Filed: Nov. 18, 2011

(65) Prior Publication Data

US 2012/0131389 A1    May 24, 2012

Related U.S. Application Data

(60) Provisional application No. 61/415,138, filed on Nov. 18, 2010.

(51) Int. Cl.
*G06F 11/00*    (2006.01)
(52) U.S. Cl.
USPC ......................................... 714/47.1; 718/102
(58) Field of Classification Search
USPC ....................................................... 714/47.1
See application file for complete search history.

(56) References Cited

U.S. PATENT DOCUMENTS

| | | | | |
|---|---|---|---|---|
| 6,188,737 | B1 * | 2/2001 | Bruce et al. | 375/355 |
| 6,519,302 | B1 * | 2/2003 | Bruce et al. | 375/355 |
| 6,769,122 | B1 * | 7/2004 | Daudel | 718/102 |
| 7,860,999 | B1 * | 12/2010 | Subramanian et al. | 709/238 |
| 8,286,172 | B2 * | 10/2012 | Chakradhar et al. | 718/102 |
| 2006/0020874 | A1 * | 1/2006 | Desai et al. | 714/780 |
| 2008/0005537 | A1 * | 1/2008 | Apparao et al. | 712/220 |
| 2010/0088492 | A1 * | 4/2010 | Chakradhar et al. | 712/220 |
| 2010/0318637 | A1 * | 12/2010 | Ly et al. | 709/221 |
| 2011/0302589 | A1 * | 12/2011 | Aussagues et al. | 718/104 |

OTHER PUBLICATIONS

Baek et al., "Green: A Framework for Supporting Energy-Conscious Programming using Controlled Approximation," SIGPLAN Not., vol. 45, pp. 198-209, Jun. 2010.
Chakradhar et al., "Best-effort Computing: Re-thinking Parallel Software and Hardware," in Proceedings of the 47th Design Automation Conference, DAC '10, pp. 865-870, ACM, Jun. 2010.
Dubey "Recognition, Mining and Synthesis Moves Computers to the Era of Tera," Technology@Intel Magazine, pp. 1-10, Feb. 2005.
Meng et al., "Best-Effort Parallel Execution Framework for Recognition and Mining Applications," in Proceedings of the 2009 IEEE International Symposium on Parallel & Distributed Processing, pp. 1-12, May 2009.
Rinard "Acceptability-Oriented Computing," in OOPSLA '03, pp. 221-239, ACM, Oct. 2003.

* cited by examiner

*Primary Examiner* — Kamini Patel
(74) *Attorney, Agent, or Firm* — Joseph Kolodka

(57) ABSTRACT

Methods and systems for cross-layer forgiveness exploitation include executing one or more applications using a processing platform that includes a first reliable processing core and at least one additional processing core having a lower reliability than the first processing core, modifying application execution according to one or more best-effort techniques to improve performance, and controlling parameters associated with the processing platform and the best-effort layer that control performance and error rate such that performance is maximized in a region of low hardware-software interference.

5 Claims, 4 Drawing Sheets

CROSS-LAYER SYSTEM ARCHITECTURE DESIGN

RELATED APPLICATION INFORMATION

This application claims priority to provisional application Ser. No. 61/415,138 filed on Nov. 18, 2010, incorporated herein by reference.

BACKGROUND

1. Technical Field

The present invention relates to hardware/software system architectures for forgiving applications and, more particularly, to error resilient system architectures combined with best-effort parallel software frameworks.

2. Description of the Related Art

A large class of traditional and emerging applications demonstrate a "forgiving" nature. In other words, they possess a significant degree of tolerance to imperfections in the computing platform on which they are executed, as well as the input data presented to them. Forgiving applications usually process large, redundant input data sets with significant noise in the input data, utilize statistical or probabilistic computations, and have a self-healing iterative refinement structure to their computations. In addition, the requirements on numerical exactness of their outputs is relaxed due to the limited perceptual capability of humans (audio and video), or since a golden result is either impossible or unnecessary. While digital signal processing, multimedia processing, and wireless communications have traditionally been considered as forgiving applications, emerging workloads such as web search and unstructured data analytics (and the larger class of applications referred to as recognition, mining and synthesis) take this forgiving nature to an unprecedented level.

The error forgiving nature of applications has been exploited, giving up perfect computations for various ends, such as improvements in power consumption or execution performance. For example, the error resiliency of probabilistic applications and their potentials for tolerating single-event upsets were has been implemented. Acceptability-oriented computing aims to reduce software development cost by making sure errors manifest only within acceptable ranges. Green is a framework for energy conscious computing that uses approximated computation to achieve energy efficiency with small degradation in QoS level. Best effort computing extensively utilizes an application's forgiving nature to achieve high degree of parallelism and performance. However, there are limits to how much a software-only approach can exploit the forgiving nature of an application.

SUMMARY

A method for cross-layer forgiveness exploitation is shown that includes executing one or more applications using a processing platform that includes a first reliable processing core and at least one additional processing core having a lower reliability than the first processing core; modifying application execution according to one or more best-effort techniques to improve performance; and controlling parameters associated with the processing platform and the best-effort layer that control performance and error rate such that performance is maximized in a region of low hardware-software interference.

A system for cross-layer forgiveness exploitation is shown that includes a processing platform that includes a first reliable processing core and at least one additional processing core having a lower reliability than the first processing core; a best-effort layer configured to utilize best-effort techniques to improve the performance of the one or more applications; and a resilience control module configured to control parameters associated with the processing platform and the best-effort layer that control performance and error rate such that performance is maximized in a region of low hardware-software interference.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

By extending application-based techniques for exploiting application forgiveness to hardware design, the present principles provide system reliability with low expense and overhead. Algorithmic noise-tolerance (ANT) voltage overscaling of DSP systems beyond the critical voltage is made possible by compensating errors using inherent noise-tolerance in DSP algorithms. For applications where degradation of output quality is acceptable (e.g., multimedia, compression), improving chip yield, power or cost with bounded computation is possible. Stochastic computation uses a statistical view of computation to estimate and detect noisy computation of underlying device and circuit fabrics. Error resilient system architecture (ERSA) allows programmable hardware architectures to be built on unreliable components that do not need expensive error protection/prevention mechanisms.

Figure 1:
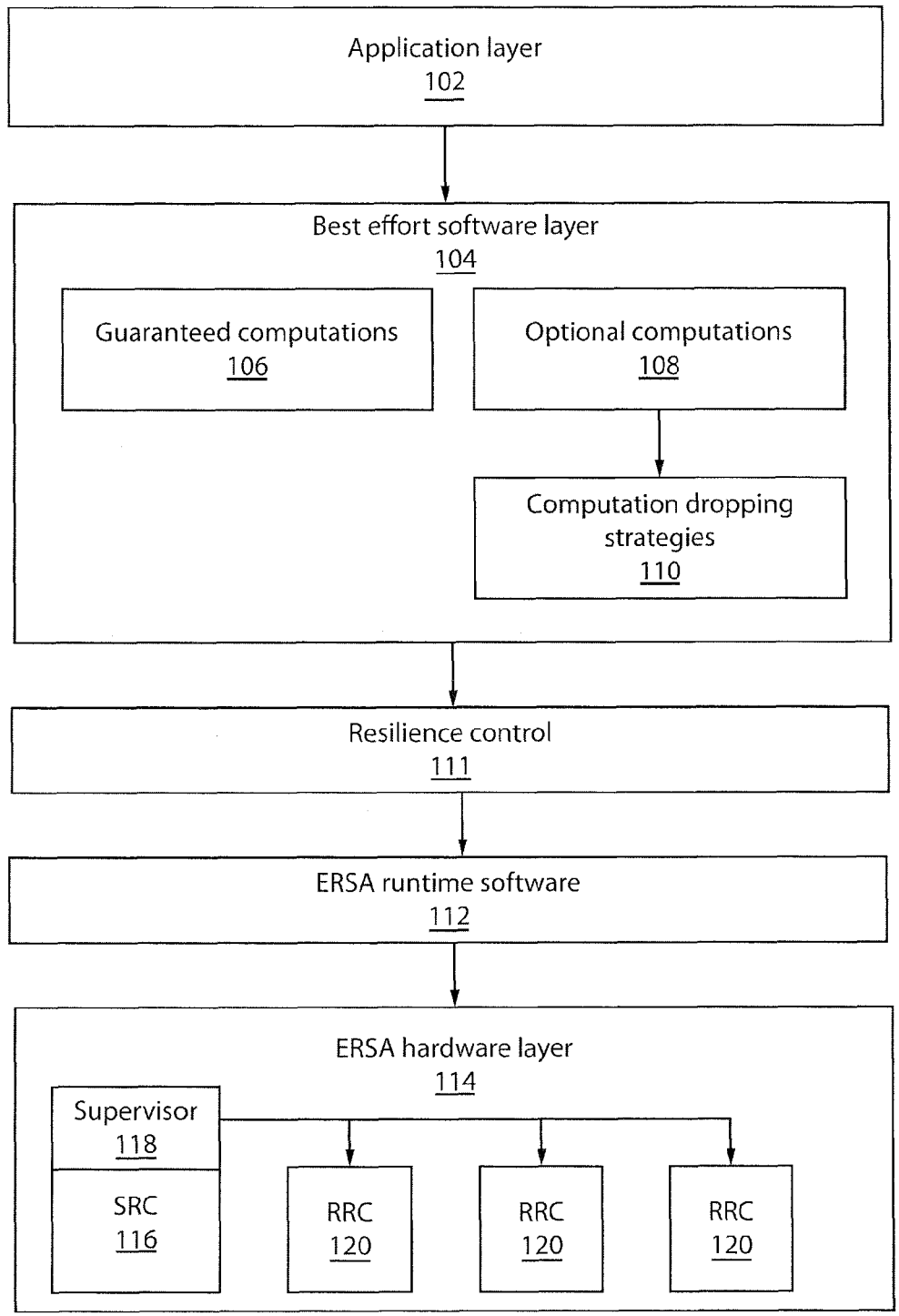
FIG. 1 is a block diagram that illustrates an exemplary cross-layer system for exploiting application forgiveness.

Referring now in detail to the figures in which like numerals represent the same or similar elements and initially to FIG. 1, an exemplary system architecture is shown that exploits application forgiveness on a software and on a hardware level. An application layer 102 includes an application that is "forgiving" in that it does not need a perfect computational result. Examples of such applications may be, e.g., multimedia encoding where small deviations from the optimal result in imperceptible changes in the final product. The application layer 102 requests computation through best effort computing layer 104, with said computations being performed by ERSA runtime software 112 on the ERSA hardware layer 114.

The best effort software layer 104 directly interacts with the application layer 102 to classify the application's computation loads into "guaranteed" computations 106 and "optional" computations 108. To increase computation efficiency, best effort layer 104 uses various computation dropping strategies 110 to reduce the computation overhead from optional computations. The selection of dropping strategy 110 will be different for each application and can be specified by the programmer or the end user. The resulting computation sets are assigned to ERSA runtime software 112 to be executed on the ERSA hardware layer 114.

ERSA hardware layer 114 includes components with various levels of reliability to increase raw computation capacity with minimal overhead. The architecture hardware layer 114 includes a small number of reliable processing cores, referred to herein as "super reliable cores" (SRCs) 116, as well as a larger number of unreliable cores, referred to herein as "relaxed reliability cores" (RRCs) 120. Computing operations on those unreliable components will result in unpredictable, abnormal behavior such as crashing, hanging, or corruption of the result. ERSA runtime software 112 and hardware 114 only adopt techniques with low overhead to detect abnormal behaviors, so as to protect overall execution efficiently. Because ERSA is focused generally on maintaining low overhead, ERSA does not guarantee the detection of every hardware error. Some computation errors are propagated to the application level 102, and will be tolerated by the application's forgiving nature. The "best effort" software and ERSA occupy different layers of the execution stack, but they are both runtime techniques and make use of the application's forgiving nature. Their interoperability and possible interference is discussed hereinbelow.

A resilience control module 111 is implemented between best effort software layer 104 and the ERSA hardware layer 114. The resilience control module 111 modulates parameters that govern the operation of both the software layer 104 and the hardware layer 114, such that the desired application output quality is achieved while performance is maximized. Alternatively, a performance constraint may be met while maximizing the output quality. In the software layer 104, the parameters that govern the aggressiveness of the best effort computing techniques (e.g., computation dropping, dependency relaxation) may be changed. In the hardware layer 114, parameters that govern the hardware error rate may include operating voltage and frequency. The resilience control module 111 operates by first characterizing the application using an abstract model of the unreliable computing platform 114 to construct performance models and iso-error contour maps for the application, which are then used to determine the values of the parameters.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As devices both within and beyond the complementary metal-oxide-semiconductor (CMOS) regime continue to scale, it is likely that unreliability will increase alongside. This leaves designers with the challenge of designing reliable computing systems without spending the processing gains from scaling on high-overhead fault tolerance schemes. The traditional approach to building reliable computing systems under possible hardware reliability is based on providing redundancy to protect the system from possible errors. Error correcting codes (ECC) and triple modular redundancy are classical ways to provide reliability, but these techniques do involve substantial overhead. For example, a given fault tolerant processor may involve up to a 43% overhead of its area to implement protection against memory system areas, and over a 100% overhead for protection against logic errors. Thus, the present principles build computing platforms from modestly unreliable devices with reasonable overheads.

Cross-layer error resilience, wherein techniques at two or more different levels of design layers of a computing stack are combined herein. Cross-layer resilience allows the most appropriate mechanisms to be employed at each layer while eschewing the excessive overheads that result from attempting to provide fixed (guaranteed) interfaces between layers. In particular, a combination of ERSA hardware 114 and best-effort parallel software frameworks 104 is illustratively discussed herein, although it is contemplated that any cross-layer approach that uses application forgiveness may be employed.

Realizing the potential of cross-layer designs is not trivial. Some issues to be addressed include:

On a fully reliable hardware substrate, the forgiving nature of applications may be exploited solely for performance or energy efficiency. However, in the context of an unreliable hardware substrate, the gains from forgiveness are apportioned toward multiple different, but interrelated, objectives. One matter dealt with herein is therefore how much of the forgiving nature should be exploited at the software layer 104 and how much should be left to absorb errors in the hardware 114.

The parallel software framework (programming model 104 and runtime 112) is responsible for partitioning the application workload into tasks and scheduling them into threads that execute on the underlying cores. For a given level of hardware reliability, the granularity of tasks significantly impacts the efficiency of parallel execution (runtime overheads), but also the probability that a task will crash or give an incorrect result, needing to be re-executed. The present principles seek to balance these two factors.

The best-effort software framework 104 and ERSA 114 exploit the forgiving nature of applications in qualitatively different ways. The best-effort framework 104 drops selected insignificant tasks altogether or relaxes dependencies between tasks (impacting the application at a larger granularity), while ERSA 114 causes the outputs of some tasks to be incorrect due to faulty instruction execution on unreliable cores 120 (impacting at a finer granularity). The present principles show that this complementary nature translates into better exploitation of the application's forgiving nature, whereby the two techniques together achieve better performance than the best performance that each is capable of achieving separately.

Both layers 104 and 114 use some fault-tolerance techniques such as error detection and re-execution. The present principles implement the two layers so as to ensure that these mechanisms operate in a synergistic manner.

To address the above issues, a cross-layer design that utilizes the ERSA architecture 114 and the best effort software framework 114 is shown. The present cross-layer architecture may be evaluated using two realistic representative forgiving applications, namely image segmentation using the K-means clustering algorithm, and face detection using Generalized Learning Vector Quantization (GLVQ) classification. In order to evaluate the present embodiments on large data sets, a hybrid evaluation framework that is comprised of an FPGA-based hardware error injection platform and a server-based native parallel software execution environment is used. The results clearly demonstrate the benefits of cross-layer design, as well as a general strategy of exploiting the forgiving nature of applications for error resilience. Compared to a design that uses 4 large reliable cores and a conventional parallel runtime (e.g., one that does not exploit the forgiving nature of applications), the present principles can achieve substantial improvements in application performance. Moreover, significant performance improvements are seen compared to using the constituent techniques within each layer individually.

Figure 2:
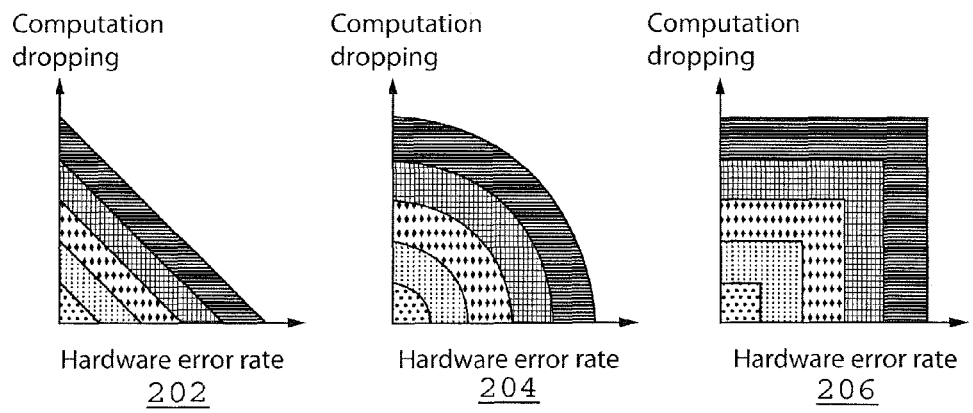
FIG. 2 is a comparison of iso-error contour maps for varying degrees of cross-level interference.

Referring now to FIG. 2, an iso-contour map for possible interferences between best effort layer 104 and ERSA hardware 114 is shown. It is not clear a priori how much the best effort software layer 104 and the hardware layer 114 will interfere with one another. Both ERSA and best effort computing can maintain high-quality outputs when used separately. These two approaches are combined herein because they operate on different layers, such that it may be expected that their interference will be minimal.

FIG. 2 shows three possible conditions, where darker shading indicates worse degradation of the computation results. On the left (plot 202) is shown a high degree of interference, on the right (plot 206) is shown complete independence, and in the middle (plot 204) is shown an intermediate scenario. It should therefore be confirmed that the differing layers allow for minimal interference, such that the level of computation error does not exceed the resiliency of application 102 when used together.

The iso-error contour maps of FIG. 2 show the quality levels of the execution results in different shadings and contour lines. The axes of the iso-error contour map correspond to the "intensity" of exploiting the forgiveness at each technique layer. Each axis therefore corresponds to how many computations are dropped in the Best effort layer 104 and the unreliability of the hardware measured in error rate in ERSA layer 114. The shape of the resulting iso-error contour map shows the interference between those two techniques. Thus, if one technique utilizes the application's forgiveness in deeper level in the map on the left, it will deplete available forgiveness and the other technique cannot be applied. In such case, there is very little incentive to build cross-layered systems. If there is less or almost no interference, such as in the graph on the middle or right, cross-layered designs will enable exploiting the error resiliency to a greater extent. As will be shown in detail below, the cross-layer architecture of the present principles results in very little interference.

The degree of interference may be quantified by measuring the area of an iso-error contour. A line segment may be drawn that connects the x and y intercepts of the contour. Let $A_1$ denote the area of the region between the line segment and the contour, and let $A_2$ denote the area of the right angle triangle formed by the line segment and the x and y axes. The interference level may then be quantified as $1-A_1/A_2$. Thus, when there is no interference, as in the right-hand graph of FIG. 2, the areas above and below the line are equal and the interference level is zero. When there is severe interference, as in the left-hand graph of FIG. 2, the area above the line segment is 0 and the interference value is 1. For the pie-shaped iso-error contour of FIG. 2, the interference value is 0.71. An application may have different degrees of interference for different quality levels, since the iso-quality contours for different quality levels are in general different. In other words, the contours may show very low interference at low error rates, but greater interdependency at higher error rates.

Computations in an application 102 may be divided into parallel task units. The granularity of the task is dependent on the application, but it can be adjusted for various goals such as increasing parallelism, reducing overhead or workload balancing. The effect of task sizing on the execution result will be different for best effort computing 104 and ERSA 114. In best effort computing 104, a "dependency relaxation" strategy enables forming bigger tasks by ignoring dependencies between certain tasks and merging many small tasks into a bigger task unit to reduce scheduling over load. However, elongated task execution time in ERSA 114 will result in higher probability of task crash and overhead for re-executing crashed task. As will be shown below, applications on ERSA 114 with Dependency relaxation Best effort strategy have difficulties to tolerating even small numbers of hardware errors.

"Tasklet recovery" may be used in ERSA execution layer 112 to address this problem. Applications that execute on parallel computing platforms routinely group their computations into tasks. These tasks are mapped and scheduled on different processing elements, e.g. 120. Partitioning of an application into tasks can be accomplished either manually or automatically by using parallel programming models. In the best effort software framework 104, partitioning of an application into parallel tasks is done automatically by using programming models. The granularity of a task depends on the application 102, as well as the computing platform 114. Reasons for changing the granularity of a task may include making each task bigger to reduce communication overhead between tasks and runtime overheads. The use of different best-effort strategies can result in varying task granularities. For example, as discussed below, the best effort framework 104 can merge multiple small tasks in a GLVQ application into a single task by using a best-effort strategy such as dependency-relaxation. This significantly reduces the costs of communication across the small tasks but each task has now become coarser grained (bigger).

By increasing task execution times, the odds of the task being adversely affected by hardware errors increases. The net effect can be a higher probability of task crashes (hardware errors have corrupted the computation so that further execution of the task is not possible), or degradation in the quality of the solution that is produced by the task, or a higher overhead for re-executing tasks that have crashed. Integration of ERSA 114 with a best effort strategy 104 such as dependency-relaxation results in a significant increase in task re-execution time, thereby greatly degrading performance. It is beneficial to decouple the granularity of computation for scheduling from the granularity of computation for error detection and recovery. To achieve this decoupling, a new abstraction of tasklets may be defined, with tasklet-based error checking and recovery schemes significantly reduce the overheads for re-execution due to hardware errors. Tasklet abstraction uses the task as the unit of scheduling to reduce scheduling and communication overheads, while using a fine-grained tasklet as the unit of error recovery to reduce error recovery overheads.

Tasklets in a task are executed sequentially on the processing core that is executing the task, e.g., 120. A tasklet accounts for a small portion of the execution time of a task, resulting in a decreased probability of a tasklet crash due to hardware errors. More importantly, if recovery becomes necessary, then re-execution of only the tasklet computations is performed, rather than re-executing the entire task. This significantly reduces the overhead of recovery. In the event of a tasklet crash, the system rolls back to the last successful tasklet computation. Therefore, only minimal execution information is stored to recover a crashed tasklet. If a task crashes, then the runtime 112 can figure out which tasklet was running and re-execute from that tasklet, rather than rewinding to the very first tasklet in the task. Note that the recovery process relies on imperfect stored status and recovery may be performed on an unreliable core 120. Therefore, the recovery process may fail to resume. If a tasklet fails 3 times consecutively, the tasklet management routine gives up the recovery and restarts the whole task again. If a task fails to complete the execution or recovery within a pre-set time limit, the reliable core 116 in ERSA 114 intervenes and reschedules the task (this is a fail-safe mechanism).

In addition to tasklet recovery, sanity checks are performed at the tasklet level. In the original ERSA 114, execution results were sanity checked only in the reliable core 116 to ensure that task results were within acceptable range. If the check fails, then the task would be re-executed. In contrast, with tasklet recovery, sanity checks are done not only at the end of the task execution, but also after the execution of every tasklet by the unreliable core 120 itself.

Note that the notion of tasklet (i.e., the amount of computation that is encapsulated in a tasklet), and the specific sanity checks for a tasklet depend on the application. The best effort software layer 104 (specifically, the parallel programming model) is augmented to delineate tasklets in a task, and to automatically introduce tasklet-level sanity checks specified by the programmer.

Shown below is pseudo code for tasklet recovery. Unreliable RRCs 120 run a loop to fetch a task from the queue and execute the task computation. Before fetching a new task from the queue, it checks the recovery slot to check if a previous task has crashed and whether it needs to re-execute from the tasklet level with the saved progress. If a given tasklet exceeds the limit of tasklet recovery attempts, then the RRC 120 will give up and report to the SRC 116 to restart the task. After each tasklet computation, the RRC 120 performs self-sanity checking and stores tasklet progress information to set the recovery point.

```
RRC_run_loop {
    task = recover_crashed;
    if (task == Null) {                // no crashed task
        task = fetch_task( );          // fetch a new task
        task.progress = 0;             // start from the beginning
    }
    else {                             // crashed task
```

```
        if (crash_limit _reached) {    // give up recovering
            clear_saved( );
            report_SRC( );
            reset( );
        }
        else {                         // recover tasklet progress
            task.progress = recover_progress( );
        }
    }
    task_run(task);
}
task_run {
    for (tasklet_idx = task.progress to task.tasklet_num) {
        tasklet_run(tasklet_idx);
        if (!Tasklet_sanity_check) {   //sanity check on RRC
            reset;
        }
        save_progress( );              // save progress information
    }
    clear_saved( );
}
```

Figure 3:
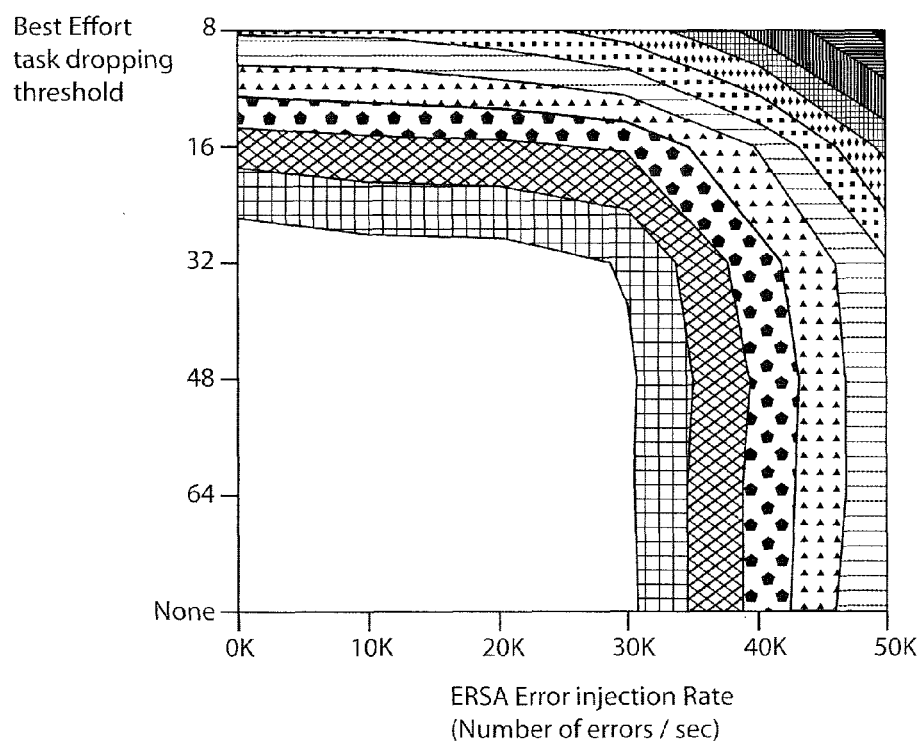
FIG. 3 is an iso-error contour map for an exemplary K-means embodiment of the present principles.

Referring now to FIG. 3, an exemplary cross-layered system 300 is shown to determine whether cross-layered embodiments are interoperable without negative interference and produce a synergistic efficiency increase. For each application, an iso-contour map will show the result quality and the interference level of the best-effort layer 104 and ERSA execution layer 114. Execution time statistics show how much efficiency gain is achievable by adopting the present cross-layered multi-level principles for error-forgiving applications.

There are several challenges to building a cross-layer system due to the ERSA hardware layer 114 being based on a proposed platform that uses error prone, unreliable components. As such, the experiments described herein have been implemented using emulated hardware unreliability by artificial error injections. Realistic applications use large computational capacities and take significant amount of time to conduct various experiments on ERSA emulation. Reducing the size of the application is not an option for these experiments because a large portion of the error forgiving nature of applications comes from its large volume of computation and the large input dataset. The error resiliency level will be different if one uses a smaller dataset or other simpler benchmark programs.

To facilitate experimentation, the ERSA execution layer 114 may be abstracted. The computation task of the application 102 may be executed multiple times with randomly chosen input datasets on an ERSA emulation platform, collecting the execution statistics with artificial error injections which will be used to abstract ERSA execution layer 114. Finally, one may project the execution statistics on the system-level experiment platform and execute the application 102 with a full dataset. The execution statistics will record the possible behavior of task computations on an ERSA layer 114 in terms of computation result error and execution time overhead. Such execution statistics may include:

Task result corruption rate: A percentage of how many tasks will produce an erroneous result that is different from the correct result. The task is executed with uniform input data without error injection to compare and collect this rate. This may be simulated by selecting a random number of tasks and artificially injecting errors into the task output.

Task crash rate: A percentage of how many tasks fail to complete execution. Task crashes can be detected by hardware or software exception handlers. If a task crashes, the execution time spent on the task is wasted and the ERSA execution layer 114 reschedules the task again. Therefore, the effect of tasks crashing can be simulated by extending execution time.

Task self-reset rate: For applications with tasklet recovery, this rate will recode the percentage of how many tasks are doing a self-reset and restart the tasklet execution in an RRC 120. The effect of tasks self-resetting is similar to a task crash, but the average time overhead is in the tasklet level.

Task timeout rate: A percentage of the tasks that violate a task execution timeout limit. Timeout is also simulated with execution time overhead, but in this case the overhead is the fixed timeout limit.

Benefits in using the ERSA execution layer 114 come from incorporating greater numbers of computing units by allowing highly scaled, though unreliable, components. The actual capacity increase and reliability levels depend on the particular physical characteristics of RRCs 120. For the purpose of illustration herein, execution in a conventional system with four reliable cores is compared to an ERSA system having eight cores. This example is not intended to be limiting in any way, and those having ordinary skill in the art would be able to construct an embodiment of the present principles according to their particular needs. The unreliability level of the system is tested with various error injection rates to determine how much unreliability can be tolerated. Toward this end, two exemplary applications 102 are used: K-means clustering and generalized learning vector quantization (GLVQ).

K-Means Clustering is a widely used unsupervised learning algorithm that groups a set of points in multi-dimensional space into K clusters based on their proximity. Erroneous computations may interfere with the algorithm from forming optimally tight clusters. The average diameter size of the resulting clusters can therefore be used as the result quality metric. As used herein, K-means performs image segmentation by clustering image pixels from a 1792×1616 image that represents a histological micrograph of tissue used for cancer diagnosis.

A best effort computing strategy is selected for K-means clustering. During the clustering iterations, many data points do not change their "cluster membership" after settling into a certain cluster. If certain data point does not migrate to other cluster after "threshold" iterations, the best effort layer 104 will drop the computation for that data point. The degree of computation dropping can be changed by adjusting the threshold iteration number.

Referring now to FIG. 3, an iso-contour map of K-means clustering is shown. The iso-contour map of FIG. 3 shows results that are very near to the rectangular shape of FIG. 2. This pattern indicates that ERSA 114 and Best effort layer 104 have very low interference and that any single layer is not able to fully utilize the forgiving nature of K-Means clustering application. Therefore, present principles which employ both techniques can safely increase the efficiency of the system. At up to 30,000 error injections per second in ERSA layer 114 and a pruning threshold of 32 iterations for Best effort layer, the result quality remains very close to the original execution's result. An execution time comparison shows that, with the new architecture, the execution speed can be 3.4 times faster compared to the conventional system, and 2 times faster than the system with Best effort computing 104 alone. Even using a high rate of error injection to simulate a very unreliable ERSA layer 114, the execution time is still substantially lower than either the conventional system or Best effort only.

GLVQ (Generalized Learning Vector Quantization) is a supervised learning algorithm used for classification. The training phase of GLVQ algorithm is a computation-intensive process and does not have substantial error resiliency. The resulting quality of GLVQ training is measured by the actual accuracy of classification test performed with the reference vectors that result from the training. Herein GLVQ is applied in an exemplary application 102 for eye image detection with 2400 images of eyes and 3000 images of non-eyes used as input data for training phase.

For GLVQ, a "dependency relaxation" strategy may be used in the Best effort computing layer 104. In the conventional GLVQ algorithm, each training set is processed sequentially due to possible data dependencies between training samples. This limits parallel processing to the finer grained micro task level, which results in substantial communication overhead. By ignoring the small chance of dependency between training samples, GLVQ with the best effort computing layer 104 may employ coarser grained tasks to "drop" communication overhead between cores. In this case, the strength of the dependency relaxation can be changed by adjusting the number of threads that are processed together, because processing more threads leads to a greater chance of ignored dependencies.

Tasklet recovery may be used with GLVQ, because the execution time of a single task may become longer than the original GLVQ runtime due to the use of dependency relaxation. Using tasklet recovery with various error injection rates it can be shown that, if only dependency relaxation is used, it is hard to tolerate even very small number of errors, resulting result in a large execution overhead. However, if tasklet recovery is employed, the execution time overhead can be lowered very close to the original GLVQ algorithm (e.g., without any best effort modification). Furthermore, tasklet level self-sanity checking can reduce the overhead even further. This is possible because sanity checking can detect computation errors much earlier than the original task execution.

Figure 4:
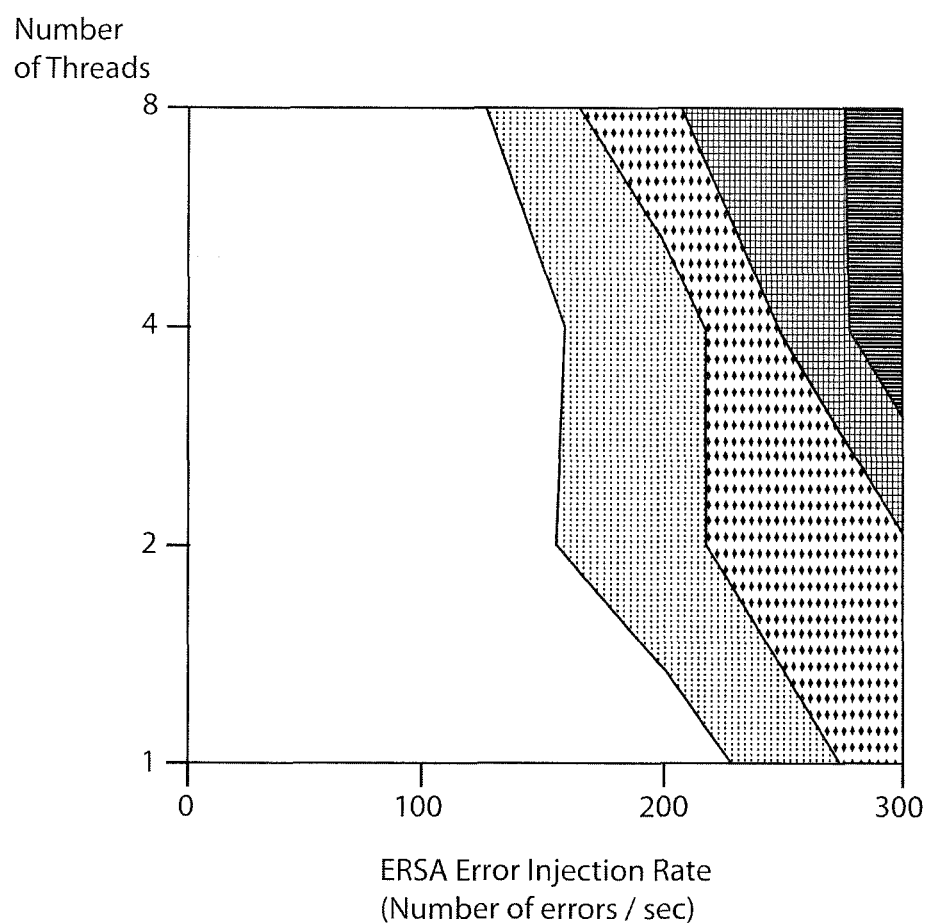
FIG. 4 is an iso-error contour map for an exemplary generalized learning vector quantization embodiment of the present principles.

Referring now to FIG. 4, an iso-contour map of GLVQ according to the present principles is shown. FIG. 4 shows very small quality degradation with the combination of dependency relaxation Best effort techniques 104 with ERSA 114. In other words, neither of Best effort computing 104 nor ERSA 114 fully utilize the possible benefit of the forgiving nature of GLVQ application. The result quality of GLVQ is very solid and has only minor degradation from hardware error or dependency relaxation. This approach may be extended by using additional cores and by implementing greater numbers of threads for dependency relaxation.

The present principles provide substantial speed improvements over conventional GLVW. In experiments, improvements in execution speed of a factor of four have been seen compared to conventional implementations, and a factor of two compared to the Best effort only case. GLVQ application can tolerate much lower levels of hardware errors as compared to K-means. Although the tasklet recovery technique allows GLVQ tasks to tolerate more errors, the size and execution time of a task in GLVQ is still larger than the tasks in K-means clustering. Dividing a task into much finer-grained tasks may be a solution for that, but would incur significantly higher overheads in task management.

Figure 5:
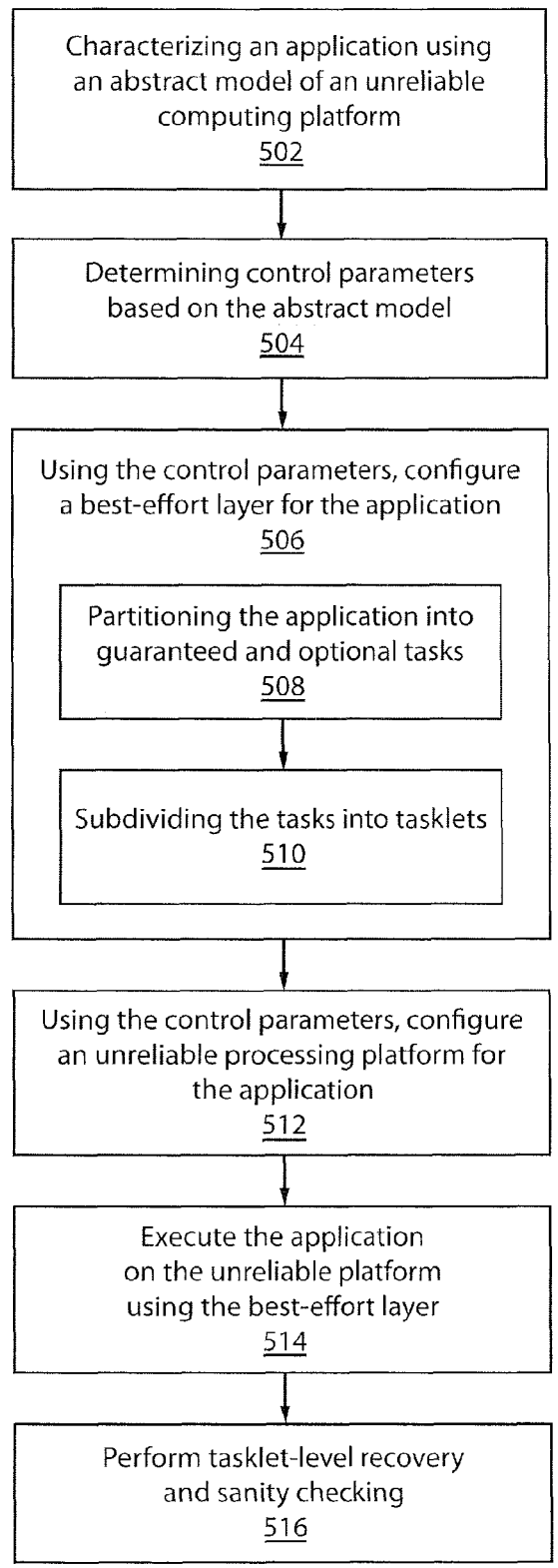
FIG. 5 is a block/flow diagram that illustrates an exemplary cross-layer method for exploiting application forgiveness.

Referring now to FIG. 5, a block/flow diagram showing exploitation of application forgiveness is shown. For a given application 102 having a degree of forgiveness, block 502 characterizes the application 102 using an abstract model of an unreliable computing platform. This characterization may include, e.g., computing iso-error contour maps and performance models. Block 502 may be performed by, e.g., a resilience control module 111. Block 504 then determines control parameters for a cross-layer system based on the abstract model.

Block 506 uses the control parameters to configure the best effort layer 104 for the application 102. Best effort layer 104 partitions the application 102 into guaranteed and optional tasks at block 508, and subdivide the tasks into tasklets at block 510. Block 512 configures an unreliable processing platform 114 for the application 102. Block 514 executes the tasks and tasklets of the application 102 on the unreliable processing platform 114 using the best effort layer 104, and block 516 performs tasklet-level recovery and sanity checking. This allows high performance execution, while minimizing the overhead caused by a failed execution on the unreliable hardware.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for cross-layer forgiveness exploitation, comprising:
    executing one or more applications using a processing platform that includes a first reliable processing core and at least one additional processing core having a lower reliability than the first processing core;
    modifying application execution at application execution time, according to one or more best-effort techniques to improve performance; and
    controlling parameters associated with the processing platform and the best-effort layer that control performance and error rate such that performance is maximized in a region of low hardware-software interferences;
    wherein the first reliable processing core has a lower error rate than the at least one additional processing core;
    wherein modifying further comprises partitioning computations of the one or more applications into guaranteed tasks and optional tasks; and
    wherein executing comprises executing the guaranteed tasks on the first reliable processing core and executing the optional tasks on the at least one additional processing core;
    wherein controlling parameters further comprises modulating one of operating voltage and frequency in the at least one additional processing core;
    wherein partitioning further comprises subdividing guaranteed and optional tasks into tasklets, such that error checking and re-execution is performed on a per-tasklet basis.

2. The method of claim 1, wherein executing further comprises ensuring correct execution of guaranteed tasks using software checks and re-execution.

3. The method of claim 1, wherein controlling parameters further comprises modulating one of a rate of computation dropping and a rate of data dependency relaxation in the best-effort layer.

4. The method of claim 1, wherein controlling parameters further comprises calculating an iso-error contour map and basing the parameters on said map.

5. A non-transitory computer readable storage medium comprising a computer readable program, wherein the computer readable program when executed on a computer causes the computer to:
    execute one or more applications using a processing platform that includes a first reliable processing core and at least one additional processing core having a lower reliability than the first processing core;
    modify application execution at application execution time, according to one or more best-effort techniques to improve performance; and
    control parameters associated with the processing platform and the best-effort layer that control performance and error rate such that performance is maximized in a region of low hardware-software interference;
    wherein the first reliable processing core has a lower error rate than the at least one additional processing core;
    wherein modifying further comprises partitioning computations of the one or more applications into guaranteed tasks and optional tasks; and
    wherein executing comprises executing the guaranteed tasks on the first reliable processing core and executing the optional tasks on the at least one additional processing core
    wherein controlling parameters further comprises modulating one of operating voltage and frequency in the at least one additional processing core
    wherein partitioning further comprises subdividing guaranteed and optional tasks into tasklets, such that error checking and re-execution is performed on a per-tasklet basis.

* * * * *